March 9, 1965 P. G. HANSEL 3,173,140
DOPPLER OMNIRANGE NAVIGATIONAL SYSTEM
Filed Feb. 20, 1959 3 Sheets-Sheet 1

INVENTOR
PAUL G. HANSEL
BY
Mitchell & Bechert
ATTORNEYS

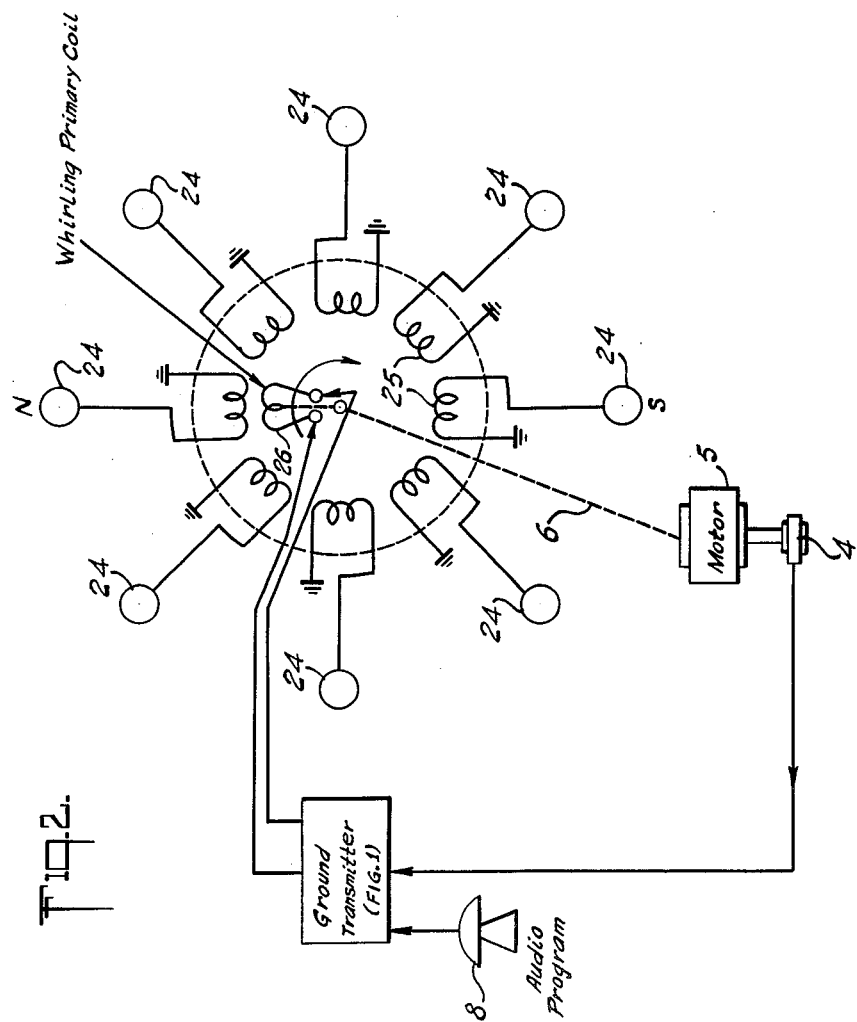

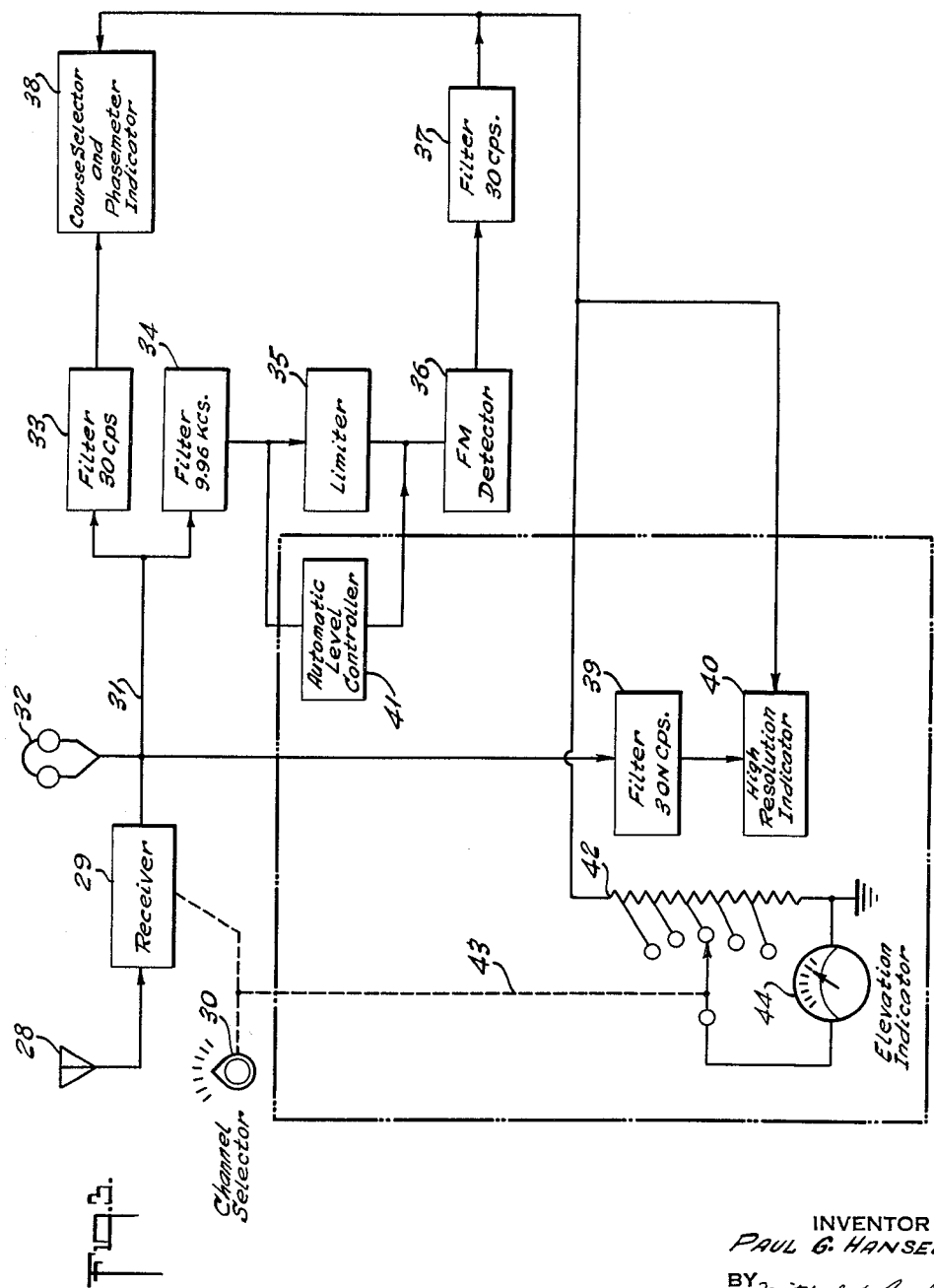

United States Patent Office 3,173,140
Patented Mar. 9, 1965

3,173,140
DOPPLER OMNIRANGE NAVIGATIONAL
SYSTEM
Paul G. Hansel, Greenvale, N.Y., assignor to Servo Corporation of America, New Hyde Park, N.Y., a corporation of New York
Filed Feb. 20, 1959, Ser. No. 794,635
16 Claims. (Cl. 343—106)

This invention relates to direction-finding equipment, and more particularly to Doppler-effect omnirange direction finders.

More specifically, this invention relates to a VOR-compatible Doppler omnirange.

The VHF (very high frequency) omnirange, commonly referred to as VOR, is the basic short range navigational system used in most countries having navigation and traffic control systems.

VOR was initially tested in 1937; however, it was not widely adopted until 1949, and by that time the system was practically obsolescent and inadequate. VOR inherently requires the use of a narrow aperture antenna and is, therefore, extremely susceptible to bearing errors and course perturbations associated with site reflections and multipath propagation. Even when the VOR ground equipment is installed on ideal sites, the instrumental accuracy of this equipment is rarely better than $\pm 2°$ to $\pm 3°$. In some areas, errors and course fluctuations in excess of $\pm 10°$ exist with the standard VOR.

The need for much more precise navigation and traffic control of aircraft has increased with the volume of air traffic.

Other navigation systems have recently been developed which are only marginally superior to VOR in accuracy. However, far more than a marginal improvement in accuracy over the VOR is required for navigation and traffic control on crowded airways. Moreover, the other proposed systems are not compatible with existing airborne VOR receiving systems and, therefore, adoption of any of these systems would result in junking a huge investment in VOR equipment. Another major problem is the high cost of the airborne equipment of these systems. Its price is beyond the means of most owners of private and business aircraft.

Accordingly, it is a primary object of this invention to provide a system compatible with existing VOR receiving equipment, and which improves greatly the accuracy of the VOR system. The novel system will hereinafter be referred to as a Doppler-effect omnirange, and includes both the simple Doppler system, which employs a revolving antenna, and the quasi-Doppler system, which employs a commutated circular array of fixed antenna elements.

It is a further object of this invention to provide a VOR compatible Doppler omnirange which has extremely high instrumental accuracy and course stability, and which is substantially immune to errors and course perturbations associated with site irregularities and multipath propagation.

It is still a further object of this invention to provide a compatible omnirange system including the advantages described above, with no change in the airborne equipment.

It is another object of the invention to provide a compatible system of greatly superior accuracy, without the usual attendant disadvantages of costly precision equipment. The novel Doppler omnirange system provides such high informational redundancy that great precision in the construction of the antenna is not required.

Another object of this invention is to provide a VOR-compatible ground installation capable of transmitting highly-accurate directional information, so that the overall system accuracy is determined entirely by the instrumental accuracy of the airborne equipment.

It is another object of the invention to increase the potential accuracy of the airborne equipment.

Still another object of this invention is to provide an adaptable elevation angle indicator for the existing airborne equipment.

Another object of the invention is to provide a high resolution indicator in the existing airborne equipment.

In accordance with an aspect of the invention, there is provided a VOR-compatible Doppler omnirange, comprising a first antenna system having an aperture exceeding two wavelengths, and preferably 5.1 wavelengths, at the frequency of the radiated energy. The energy is radiated periodically from successively different points uniformly disposed on the circumference of a circle, whereby the R.F. phase of the energy at a distant point is periodically modulated in a manner dependent upon the direction of the point relative to the antenna system. VOR-compatibility is obtained by providing a second antenna system for radiating energy which differs in frequency from the energy radiated by the first antenna system by a predetermined amount, preferably equal to the subcarrier frequency of the VOR. The energy radiated by the second antenna system is amplitude modulated with a reference signal synchronized with the phase-modulation period of the energy radiated from the first antenna system. The energies are received by a distant receiver, which includes means for detecting both the reference modulations and the direction-dependent phase and frequency variations in the omni-directionally radiated energy caused by the effective point of transmission traveling around the circle of the first antenna system. The relative phase of the reference signal and the detected direction-dependent signal is compared and the phase difference is an indication of the direction of the receiver relative to a reference direction.

The above-mentioned and other features and objects of this invention and the manner of attaining them will become more apparent and the invention itself will be best understood by reference to the following description of an embodiment of the invention taken in conjunction with the accompanying drawing, wherein:

FIGURE 2 is a schematic diagram of a commutated quasi-Doppler antenna system with sinusoidally-blended commutation; and FIGURE 3 is a block diagram of a conventional VOR airborne receiving and indicating equipment with the additional features of elevation determination and high resolution indication provided by the invention.

Figure 1:
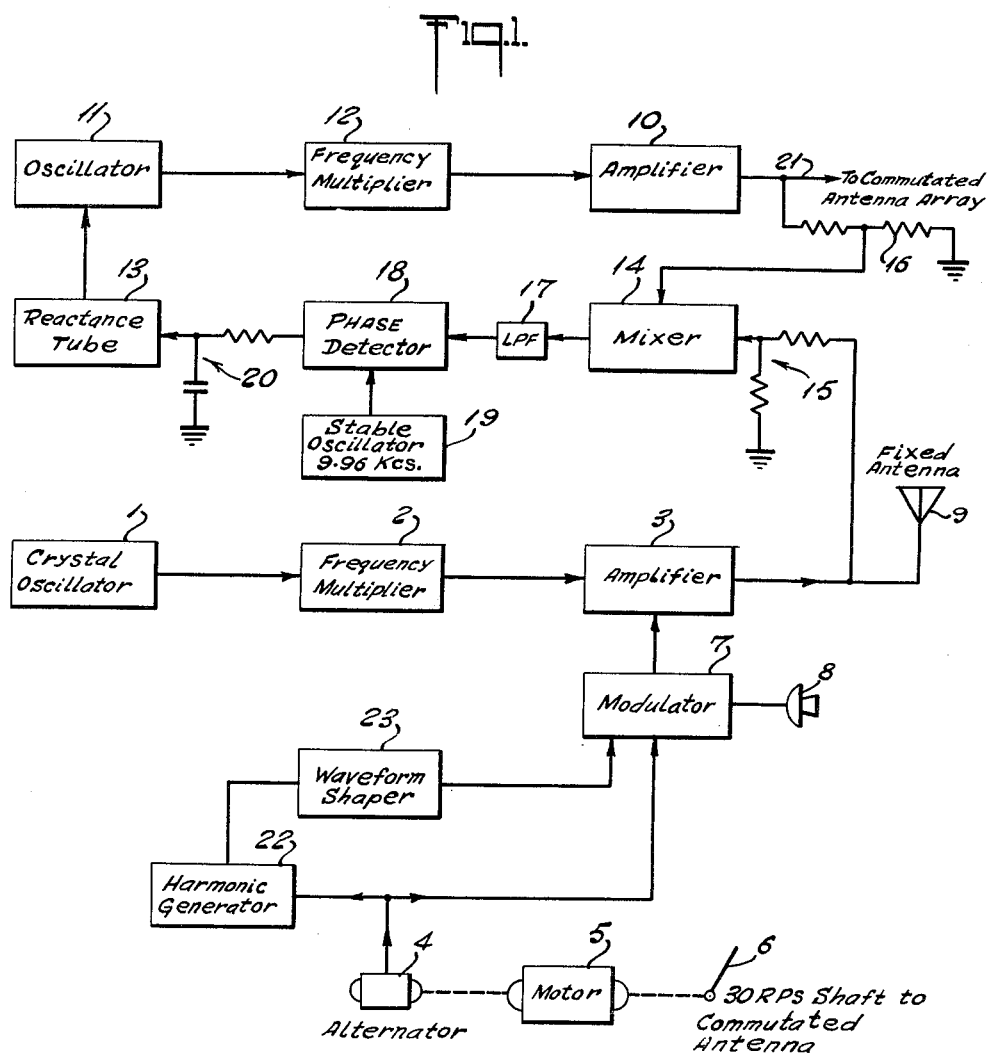
FIGURE 1 is a block diagram of a two-frequency ground transmitter.

Before discussing the details of the invention, the operating parameters of VOR should be understood. These parameters, of course, must be retained in order for the invention to be compatible.

The carrier frequency range of the present VOR is 112 to 118 mcs.; the direction-dependent data is contained in a wave 30% amplitude modulated at 30 c.p.s. rate; and the reference data is contained in a 9.96 kcs. sub-carrier, frequency-modulated at 30 c.p.s. with a maximum deviation of 480 c.p.s. The sub-carrier is 30% amplitude modulated on the transmitted carrier.

In accordance with a broad aspect of the invention, the Doppler omnirange is made compatible with existing airborne equipment by producing at the airborne receiver output a 30 c.p.s. fixed-phase reference signal and a 9.96 kcs. sub-carrier signal, frequency-modulated at a 30 c.p.s. rate, with a maximum deviation of 480 c.p.s. and with the envelope phase of the frequency modulation equal to the bearing.

Generally, the ground transmitter generates a first signal of the nominal VOR carrier frequency $F_c$, which is amplitude-modulated of a fixed phase at 30 c.p.s. This signal is transmitted from a fixed antenna which may, for convenience, be placed at the center of an array of commutated antennas.

The ground transmitter also generates a second signal having a frequency of either $F_c+9.96$ kcs. or $F_c-9.96$ kcs. The transmitter may generate as the second signal either or both of these frequencies. This second signal is applied to a commutated antenna system.

Referring now to FIGURE 1, a two-frequency ground transmitter is illustrated with provision for the maintenance of an accurately-determined difference between the two frequencies and with provision for transmitting a frequency-multiplied reference signal. The first signal is generated by a portion of the transmitter, comprising a crystal oscillator 1, a frequency multiplier 2 and a power amplifier 3. A 30 c.p.s. modulating signal is derived from an alternator 4, which is driven synchronously by motor 5 with the shaft 6 of the commutated antenna system shown in FIGURE 2. This 30 c.p.s. reference signal is applied to modulator 7, which modulates the carrier amplifier 3. Voice modulation may also be applied to the modulator 7 from the output of microphone 8. The first signal obtained at the amplifier output has a frequency $F_c$ and is applied to a fixed antenna 9.

The second signal is derived from amplifier 10 which receives its excitation from oscillator 11 and frequency multiplier 12. The output of amplifier 10 is applied to the commutated antenna system.

The frequency of oscillator 11 is controlled over narrow limits by a reactance tube 13. Other forms of frequency control transducers may, of course, be used. Examples of suitable alternative forms are electromechanical transducers, saturable reactors and back-biased semiconductor diodes.

A signal to control the reactance tube 13, so that the required frequency difference of 9.96 kcs. is accurately maintained, is derived as follows: A portion of the outputs of amplifiers 3 and 10 is applied to a mixer 14 through voltage dividing networks 15 and 16. The output of mixer 14 is fed through a low pass filter 17 to a phase detector 18. The mixer output has a frequency equal to the frequency difference between the outputs of the two amplifiers. A very stable oscillator 19, of frequency 9.96 kcs., is also applied to phase detector 18. The phase detector output is applied through an integrating network 20 to the reactance tube 13. The reactance tube, therefore, controls oscillator 11 so that the output of amplifier 10 differs in frequency from the output of amplifier 3 by precisely 9.96 kcs., plus whatever error might exist in oscillator 19. If oscillator 19 is crystal-controlled, this error will be negligibly small. The control loop just described provides frequency and phase control of oscillator 11 to such degree that extraneous frequency or phase modulation existing at the output of amplifier 10 will be negligibly small.

The relative carrier powers delivered to the fixed and commutated antennas can be varied over wide limits. It is preferable to supply the greater power to the fixed antenna. The power level supplied to the commutated antennas should be adjusted to provide a 9.96 kcs. output from the airborne receiver generally equivalent to the 30% double-sideband modulation of the present VOR.

The angular resolution and indicating accuracy of the airborne equipment are greatly increased by the addition to the ground system of a harmonic generator 22 and waveform shaper 23, driven by the output of alternator 4. The harmonic generator multiplies the frequency of the reference signal from the alternator by a factor N, for example, ten times. Waveform shaper 23 may be a simple bandpass filter to provide a 30N c.p.s. high-resolution sinusoidal reference signal, or it may be a pulse forming network to supply a high-resolution reference signal in the form of a pulse having a repetition rate of 30N c.p.s. The multiplied reference signal, regardless of its form, is applied to modulator 7 and appears, preferably as amplitude modulation, on the carrier output of amplifier 3. The presence of this frequency-multiplied reference modulation in no way disturbs the compatibility of the signal with respect to existing airborne VOR equipment, but it does provide a convenient means for improving the accuracy of the airborne equipment, as will appear in the description of the airborne equipment.

In a quasi-Doppler omnirange, the revolving antenna of the simple Doppler system is simulated by commutating a circularly-disposed array of fixed antenna elements. This is generally illustrated in FIGURE 2. The fixed antenna elements are shown at 24 coupled respectively to fixed secondary coils 25. The commutator is in the form of a rotating primary coil 26, which provides sinusoidal fade from one antenna to the next. The shaft 6 of the motor 5 is shown by dashed lines connected to the primary coil 26. The signal radiated from the commutated antenna carries direction-dependent frequency modulation information. VOR compatibility is achieved by transmitting the second carrier from the independent fixed antenna 9. This carrier differs in frequency by 9.96 kcs. from the carrier supplied to the commutated antenna and is amplitude-modulated with a reference signal synchronized to the antenna commutation.

As will be apparent to those skilled in the art, the data and reference signals are interchanged in the VOR-compatible Doppler omnirange, as compared to their roles in the standard VOR. This is of no practical consequence since the bearing intelligence is contained only in the relative phase of the two signals.

In an article appearing in the Proceedings of the I.R.E., December 1953, entitled "Doppler-Effect Omnirange," the principles of direction-determination, utilizing the Doppler effect, were explained. Briefly, the envelope phase of the frequency-modulated carrier, as observed at a distant receiver, is a continuous function of the direction from the transmitter to the receiver. This instantaneous frequency observed at a distance receiver varies sinusoidally about the carrier frequency at a rate equal to the effective rate of revolution of the transmitting antenna. The maximum frequency deviation $\Delta f$ is:

$$\Delta f = \frac{f_c W_r R}{C}$$

$f_c$ is the carrier frequency, $W_r = 2\pi S$ (S being the scanning rate in r.p.s.), R is the radius of the circle, and C is the velocity of light. The equation may be rewritten as: $\Delta f = \pi D S$, where D is the aperture or diameter of the antenna circle expressed in wavelengths. Applying the latter equation to the VOR parameters $$\Delta F = 480 = 30\pi D, \text{ and } D = \frac{480}{30\pi} = 5.1$$

wavelengths.

Thus, a VOR-compatible Doppler effect omnirange must have an aperture close to 5.1λ. A practical fixed value of antenna aperture for the 112 to 118 mcs. carrier frequency range of the VOR is 43 feet. With an aperture of this magnitude, the bearing errors and course perturbations, commonly referred to by such terms as "site error," "multipath error" and "course scalloping," are negligibly small.

The antenna elements of the quasi-Doppler array are uniformly spaced around a circle having a diameter of 5.1λ or a circumference of 16λ. The number of antenna elements required to produce an acceptable simulation of the revolving antenna of a true Doppler system is determined by the maximum permissible phase step between elements.

It has been shown experimentally that excellent simulation of a revolving antenna is obtained in a quasi-Doppler system employing sinusoidally-blended commutation with a maximum adjacent-element phase step of 120° or a spacing between elements of $\lambda/3$. When many elements are used, the chord is approximately equal to the arc, so far a 120° maximum phase step, the minimum number of elements N, is given by the relation $$N = \frac{16\lambda}{\lambda/3} = 48$$

This is a structurally reasonable number of elements. Moreover, a system with 48 elements possesses an enormous redundancy and is, therefore, extremely non-critical to construct and adjust and exhibits extremely small instrumental error.

It is now well established that when antenna aperture is increased from the standard, and maximum permissible value of approximately $\lambda/4$ for VOR, to a value in excess of $2\lambda$, site errors and multipath errors are reduced to low values. In fact, with a $2\lambda$ aperture system, the principal limitation on system accuracy on good sites is the instrumental accuracy of the bearing indicator alone. The advantages of the inventive system utilizing an aperture of $5.1\lambda$ should now be apparent. The inventive system can be operated on extremely poor sites and exhibits very low site errors, multipath errors and course scalloping.

Regarding now the airborne receiver, the reference signal is detected directly and the two carriers beat together to produce a sub-carrier, which is frequency-modulated by the bearing information. This sub-carrier is de-modulated by the normal sub-carrier discriminator in the VOR receiver to recover a signal whose phase, relative to the signal, is equal to the bearing.

FIGURE 3 illustrates the conventional VOR airborne receiving and indicating equipment with the novel features added by this invention shown within the dot-and-dash enclosure. The conventional portions of this equipment comprise a receiving antenna 28, a receiver 29 tuned by a channel selector 30, and a receiver output 31 divided into three paths. The first path leads to a listening device, such as a pair of headphones 32. The second path leads to a 30 c.p.s. band pass filter 33 and the third path leads to a 9.96 kcs. band pass filter 34. The output of filter 34 is amplitude-limited by limiter 35 and applied to FM detector 36. The output of FM detector 36 is applied to a 30 c.p.s. band pass filter 37, which is identical to filter 33. The two 30 c.p.s. outputs of filters 33 and 37 are applied to a conventional VOR course-selector and phasemeter indicator 38.

In accordance with another aspect of the invention, a high resolution capability is provided in the following manner. The receiver output 31 is applied, through a band pass filter 39 tuned to 30N c.p.s., assuming sinusoidal variations, to a high resolution phasemeter indicator 40. The output of band pass filter 37 is also applied to indicator 40. Several forms of phasemeter indicators are known in the art which exhibit high indicating resolution when furnished with a frequency-multiplied reference. The high resolution indicator itself is not a part of this invention. If the multiplication factor of the phase reference signal N is 10, the resolution of the indicator will be increased by a factor of 10.

Before discussing the elevation determining capabilities of the invention, it is helpful to know that the frequency deviation of a Doppler system may be expressed by the relation: $\Delta F = \pi DS \cos \beta$, where D is the aperture or diameter of the antenna circle expressed, in wavelengths, S is the commutation or scanning rate in revolutions per second, and $\beta$ is the elevation angle.

The significance of the equation is that elevation angle determination can be made in the air if the airborne receiver is provided with a means for measuring the frequency deviation. This is accomplished by applying an amplitude controlled input to the FM detector 36. The amplitude of the signal is controlled by automatic level controller 41. Many circuits for accomplishing this function are well known. For example, a conventional high-gain AGC circuit may be used, or the limiter may be constructed with Zener diodes as the non-linear elements. Since the input to the FM detector 36 is accurately predetermined by element 41, the voltage output of the FM detector is accurately proportional to the deviation $\Delta F$. For a given physical aperture in the antenna system and a given elevation angle, the deviation is linearly proportional to frequency. The scale factor, therefore, of a voltmeter receptive to the output of the FM detector, and used as the indication of elevation angle, should be adjusted to the particular carried frequency used. This is accomplished by applying the filtered output of FM detector 36 to a voltage divider 42. If a continuously tunable receiver is used, voltage divider 42 would be a potentiometer. In general, however, VOR receivers employ a switch type channel selector and a tapped voltage divider with a movable arm is coupled mechanically, as suggested by dashed lines 43, to channel selector 30. The voltage levels are adjusted so that the highest voltage tap of divider 42 is used at the lowest carrier frequency and the tap provides a linearly-decreasing voltage output as the carrier frequency is increased. An elevation indicator 44 may be simply an A.C. voltmeter with cosine-law calibration marks reading directly in elevation angle. For example, a full-scale reading would correspond to a zero elevation angle and a half-scale reading would correspond to a 60° elevation angle.

Thus, it should now be apparent that the invention provides a unique navigation system which is fully compatible with existing VOR systems and which greatly improves the accuracy of the VOR systems. In addition, the invention provides a simple but accurate elevation angle indicator and a high resolution indicator in the airborne equipment.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A VOR-compatible Doppler omnirange comprising a first antenna system having an aperture exceeding two wavelengths at the frequency of the radiated energy, a first source of energy having a predetermined frequency, means for applying said energy to said antenna system so that the energy is radiated periodically from successively different directional points whereby the phase of said energy at a distant point varies periodically in a manner dependent on the direction of said point relative to said antenna system, a second antenna system, a second source of energy differing in frequency by a predetermined amount from the energy of said first source, means for amplitude modulating said second source of energy with a reference signal synchronized with the period of radiation of said first energy, means for applying the amplitude modulated energy to said second antenna system, and a receiver for the radiations from said first and second antenna systems including means for detecting the direction-dependent phase and frequency variations in the directionally radiated energy of the first antenna system, and means for comparing the phase of said reference signal and said detected signal, whereby the phase difference is an indication of the angular position of the receiver relative to the direction indicated by said reference signal.

2. The omnirange according to claim 1, wherein said first antenna system has an aperture of 5.1 wavelengths, said first source of energy has a frequency of $f_c \pm 9.96$ kcs., and said second source of energy has a frequency of $f_c$, where $f_c$ is the nominal VOR frequency.

3. The omnirange according to claim 2, wherein said first antenna system comprises a plurality of fixed antennas arranged in a circular array, and commutator means for applying the energy from said first source to said antennas in periodic time sequence, the rate of commutation producing the equivalent of a Doppler effect at the receiver.

4. The omnirange according to claim 3, wherein said second antenna system comprises a fixed omnidirectional antenna located centrally in said circular array.

5. The omnirange according to claim 4, wherein said second source of energy is modulated in fixed phase at a 30 c.p.s. rate.

6. A VOR-compatible Doppler omnirange, comprising a plurality of fixed antennas disposed in a circular array and having an aperture exceeding two wavelengths at the frequency of the radiated energy, a first source of energy having a frequency $f_c \pm 9.96$ kcs., commutator means for applying the energy from said source to said antennas in succession at a rate of 30 c.p.s., whereby the energy is directionally radiated from successively different antennas in the array, a fixed omnidirectional antenna located centrally of said circular array, a second source of energy having a frequency $f_c$, where $f_c$ is the nominal VOR frequency, means for amplitude modulating said second source of energy in fixed phase at a 30 c.p.s. rate, the amplitude modulated waves constituting a reference signal means for applying the amplitude modulated energy to said second antenna system, a receiver spaced from said antennas for receiving the radiations therefrom, including means for detecting the direction-dependent phase and frequency variations in the directionally radiated energy caused by the commutating antennas, and means for comparing the phases of said detected signals and said reference signals, whereby the phase difference is an indication of the position of the receiver relative to the direction indicated by said reference signal.

7. The omnirange according to claim 6, and further comprising a harmonic generator coupled to the output of said second source of energy for multiplying the frequency of the reference signal to 30N c.p.s., and means in said receiver for detecting said multiplied reference signal, and means for comparing the phase of said multiplied frequency signals with the phase of said detected energy, whereby the resolution of the phase difference is increased by the factor N.

8. The omnirange according to claim 7, and further comprising in said receiver a first filter tuned to said reference signal frequency of 30 c.p.s., a second filter tuned to the frequency of said first source of energy $f_c \pm 9.96$ kcs., an FM detector coupled to the output of said second filter, a third filter tuned to the commutation frequency of 30 c.p.s. coupled to the output of said FM detector, and the output of said respective 30 c.p.s. filters being applied to the phase comparing means.

9. The omnirange according to claim 8, and further comprising means in said receiver for controlling and levelling the amplitude of the signals applied to said FM detector, whereby the output of said detector is proportional to a deviation frequency $\Delta F$, the deviation frequency being related to the elevation angle of the receiver relative to the antennas, by the equation $\Delta f = \pi DS \cos \beta$, where D is the aperture of the antenna circle expressed in wavelengths, S is the commutation rate in revolutions per second, and $\cos \beta$ is the elevation angle; meter means coupled to the output of said third filter responsive to said deviation frequency for indicating elevation angle, and means for adjusting said meter means in accordance with the particular frequency of said first source of energy, whereby the meter may be made selectively responsive to different frequencies.

10. VOR-compatible Doppler omnirange transmitter comprising a first antenna system having an aperture exceeding two wavelengths at the frequency of the radiated energy, a first source of energy having a predetermined frequency, means for applying said energy to said antenna system so that the energy is radiated periodically from successively different spaced points, whereby the phase of said energy at a distant point is dependent on the direction of said point relative to said antenna system, a second antenna system, a second source of energy differing in frequency by a predetermined amount from the energy of said first source, and means for amplitude modulating said second source of energy with a reference signal synchronized with the period of radiation of said first energy, means for applying the amplitude modulated energy to said second antenna system, whereby the phase difference between the directionally radiated energy and the reference signal is an indication of the direction of said distant point relative to the direction indicated by said reference signal.

11. The omnirange according to claim 10, wherein said first antenna system has an aperture of 5.1 wavelengths, said first source of energy has a frequency of $f_c \pm 9.96$ kcs., and said second source of energy has a frequency of $f_c$, where $f_c$ is the nominal VOR frequency.

12. The omnirange according to claim 11, wherein said first antenna system comprises a plurality of fixed antennas arranged in a circular array, and commutator means for applying the energy from said first source to said antennas in periodic time sequence, the rate of commutation producing the equivalent of a Doppler effect at a distance receiver.

13. The omnirange according to claim 12, wherein said second antenna system comprises a fixed omnidirectional antenna located centrally in said circular array.

14. The omnirange according to claim 13, wherein said second source of energy is modulated in fixed phase at a 30 c.p.s. rate.

15. The transmitter according to claim 10, wherein said first and second sources of energy each comprise respectively, a first oscillator, frequency multiplier and amplifier connected in succession to said first and second antenna systems respectively, and further comprising means coupled to said first and second sources for maintaining constant the frequency difference therebetween.

16. The transmitter according to claim 15, wherein said means for maintaining the frequency difference constant between said first and second sources comprises a mixer coupled to the output of the respective amplifiers, whereby the difference frequency appears at the output of said mixer, a phase detector, said mixer output being coupled to one input of said detector, a highly stabilized oscillator tuned to said difference frequency and coupled to another input of said detector, whereby the output of said phase detector is proportional to the deviation from said difference frequency, and an oscillator control circuit coupled to the output of said detector and responsive to the output of said detector for adjusting the frequency of said first oscillator of said first energy source until the deviation from said difference frequency disappears.

References Cited in the file of this patent

UNITED STATES PATENTS

| | | |
|---|---|---|
| 1,915,784 | Hammon | June 27, 1953 |
| 2,210,651 | Busignies | Aug. 6, 1940 |
| 2,490,050 | Hansel | Dec. 6, 1949 |
| 2,511,030 | Woodward | June 13, 1950 |
| 2,551,828 | De Fremery | May 8, 1951 |
| 2,570,880 | Stenning | Oct. 9, 1951 |
| 2,686,304 | Ruben | Aug. 10, 1954 |
| 2,713,163 | Himmel | July 12, 1955 |
| 2,753,556 | Pickles | July 3, 1956 |
| 2,804,615 | Weihe | Aug. 27, 1957 |

FOREIGN PATENTS

| | | |
|---|---|---|
| 777,055 | Great Britain | June 19, 1957 |

OTHER REFERENCES

Hansel: "Doppler-Effect Omnirange," Proceedings of the IRE, vol. 4, No. 12, December 1953, pp. 1750–1756.